United States Patent [19]
Brown

[11] Patent Number: 5,229,798
[45] Date of Patent: Jul. 20, 1993

[54] STABILIZED EQUIPMENT SUPPORT, PRIMARILY FOR USE WITH HAND-HELD CAMERAS

[76] Inventor: Garrett W. Brown, 515 Addison Ct., Philadelphia, Pa. 19147

[21] Appl. No.: 817,477

[22] Filed: Jan. 3, 1992

Related U.S. Application Data

[60] Continuation-in-part of Ser. No. 511,723, Apr. 20, 1990, Pat. No. 5,098,182, which is a division of Ser. No. 247,900, Sep. 22, 1988, Pat. No. 4,946,272.

[51] Int. Cl.⁵ .................. G03B 17/00; G03B 21/00
[52] U.S. Cl. ............................. 352/243; 354/82; 354/293
[58] Field of Search ............... 352/243; 354/82, 293

[56] References Cited

U.S. PATENT DOCUMENTS

| | | | |
|---|---|---|---|
| 3,266,403 | 8/1966 | Anderson | 352/243 |
| 4,158,489 | 6/1979 | Gottschalk | 352/243 |
| 4,177,967 | 12/1979 | Marchus | 352/243 |
| 4,244,500 | 1/1981 | Fournier | 352/243 |
| 4,474,439 | 10/1984 | Brown | 352/243 |
| 4,672,436 | 6/1987 | Hawthorne | 352/243 |

Primary Examiner—Monroe H. Hayes
Attorney, Agent, or Firm—Weiser & Associates

[57] ABSTRACT

A stabilized equipment support which is both small and light-weight in construction, for receiving equipment (e.g., a camera) with which it is to be used upon an expanded support network which complements the supported equipment in a manner which not only alters the position of the center of gravity for effective support of the resulting assembly, but which further ensures that the equipment support can be folded into a compact arrangement which does not significantly increase the profile, or overall size of the assembled combination, yet which is easily deployed to assume an expanded balanced arrangement which is appropriate for stabilized operations of the resulting assembly in simple and straightforward fashion, while minimizing the potential for precession during such use.

53 Claims, 6 Drawing Sheets

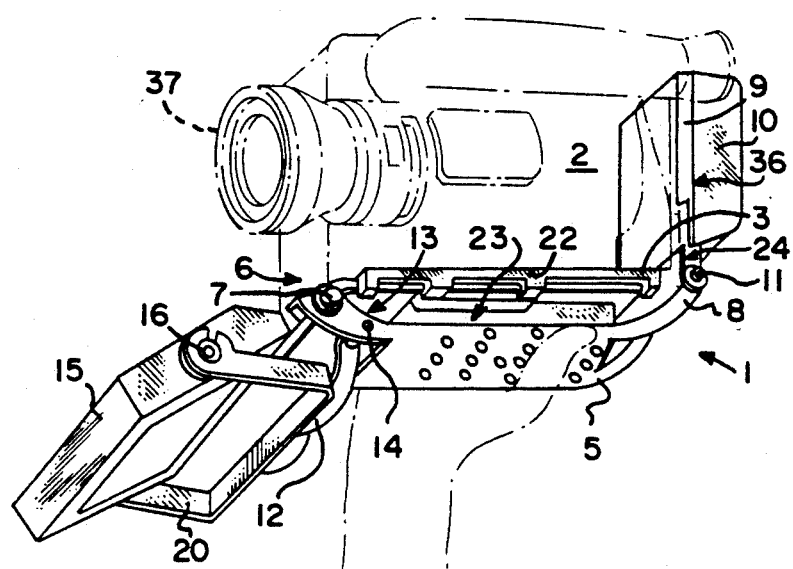
FIG. 5

STABILIZED EQUIPMENT SUPPORT, PRIMARILY FOR USE WITH HAND-HELD CAMERAS

RELATED CASES

This is a continuation-in-part of prior copending U.S. patent application Ser. No. 07/511,723, filed on Apr. 20, 1990, now U.S. Pat. No. 5,098,182, which is in turn a division of U.S. patent application Ser. No. 07/247,900, filed on Sep. 22, 1988, and since issued as U.S. Pat. No. 4,946,272, dated Aug. 7, 1990, each of which are incorporated by reference as if fully set forth herein.

BACKGROUND OF THE INVENTION

The present invention generally relates to the field of stabilized equipment supports, and more particularly, to an apparatus for supporting hand-held cameras or other equipment which may be orientation-sensitive and/or stability-sensitive so that such equipment is isolated from unwanted motions while in operation.

Many different types of "hand-held" cameras have been developed, virtually since the beginning of photography. Whether for still pictures or for motion pictures, as a result of the artistic needs of such media, virtually every such model of camera which was light enough to be lifted has at some times been "held" by a human operator. However, in each case, the inherent instability of such equipment immediately became a corresponding factor. Such difficulties are further multiplied when motion pictures are involved, since the operator may now need to walk and at time even run with the camera to obtain the necessary motion picture images.

Responsive to this, devices of the type described in U.S. Pat. No. 32,213 (Brown), and later U.S. Patent No. 4,208,028 (Brown et al), were developed. Such devices generally approached the problem of camera stabilization by providing a spring-loaded equipoising arm for supporting a gimbal-mounted expanded camera system. The disclosed unit serves to isolate the camera from both angular and spacial motions and has proved to be quite effective in allowing the camera operator to produce exceedingly stable images in a variety of different situations. As a consequence, such devices have since become standard tools in the motion picture and video industries, operating to satisfy a variety of the needs in such industries.

Such devices were primarily designed to support relatively large film and video cameras, exhibiting significant weights. Even the lightest of cameras contemplated for use in connection with such systems were on the order of twenty pounds, and it is presently not uncommon for complete systems (including the stabilized mounting, camera, and supporting equipment) to exceed ninety pounds as operating requirements become more varied and complex. However, such devices were considered to be unsuitable for adaptation to cameras which were significantly lighter than those conventionally employed in the motion picture and video industries.

Subsequently, camera technology evolved to the point where portable video cameras became available which were primarily directed toward consumer-oriented applications. A variety of formats for this product were initially developed, with continued efforts toward miniaturization and simplification due to the unit's consumer-oriented market. Initial attempts at developing an independent, fully self-sufficient consumer video camera (i.e., "CamCorder") involved the so-called "full-sized" CamCorders, self-contained camera and recording units designed to rest on the shoulder of the operator, with a viewfinder mounted forward and to the side of the resulting unit. Following this, the so-called "compact" CamCorders were developed, which rapidly captured a significant portion of the consumer market. These "compact" CamCorders were sufficiently small to be supported entirely by the hand (or hands) of the operator (rather than being placed over the operator's shoulder), with the camera held in front of the operator's face, and with the viewfinder (generally top-mounted) in close proximity to the operator's eye.

By virtue of their appeal to the general consumer, a large number of "compact" CamCorders were sold. However, such units, as a result of the manner in which they are supported by the camera's operator, were found to be inherently unstable. In addition to their inherent instability, such "compact" CamCorders were being operated by amateur photographers, still further complicating matters. The common result was an unstable and often unacceptable video image. This was particularly so when the operator departed from a stationary position, and attempted ambulatory operations of the unit.

U.S. Pat. No. 4,946,272 (Brown) discloses a stabilized equipment support which is particularly suited to accommodate, and substantially eliminate the inherent instability of a "compact" CamCorder, to permit highly stable, professional video images to be obtained making use of conventionally available "compact" CamCorders. This was achieved by providing a stabilized support which is both small and light-weight in construction, and which is capable of receiving the equipment with which it is to be used upon an expanded support network which complements the supported equipment in a manner which alters the position of its center of gravity so that the resulting unit can be effectively supported at its center of gravity using a novel handle assembly.

As disclosed, the equipment support is generally comprised of a platform for receiving the equipment (a camera), which is counter-balanced by a viewfinding device and a battery or batteries for operating the equipment. Appropriately configured struts are preferably used to interconnect the platform and the viewfinding device, and to provide support for the system's battery or batteries. The platform further preferably incorporates an adjustment mechanism (e.g., an "x-y" table) for permitting relative adjustment between the equipment receiving platform and the handle which supports the assembly, to achieve an appropriate balance of the resulting unit. This adjustment mechanism includes a fitting for receiving the handle which supports the platform, at a position which intersects with the center of gravity of the equipment and the supporting system which receives it, to achieve an appropriate static balance of the resulting unit about each of three mutually perpendicular axes.

The disclosed supporting handle preferably takes the form of a two-part (i.e., "interrupted") handle which is generally comprised of a major portion which can be engaged for overall support and transport of the unit, and a minor portion which includes a generally cylindrical control surface which is accessible by the hand (preferably the thumb and index finger) to achieve controlled orientation of the equipment support, which are separated by an appropriate device for providing mutual isolation between the two portions of the compound handle. Preferably, the isolation device which separates the two distinct portions of the handle is a gimbal or other device which provides angular isolation about three generally perpendicular axes, while being virtually frictionless as well as freely pivotable and rotatable to permit proper control of the equipment and its support. As a result, the handle not only operates to receive forces for both support and transport of the equipment, but also to appropriately orient the device while functioning to provide mutual isolation between the supported equipment and the angular influence of the forces which are applied to the handle.

Further evolution in camera technology has since resulted in still further miniaturization and simplification of the hand-held CamCorder. Indeed, hand-held CamCorders have since been developed which are sufficiently small to fit within the palm of the operator's hand, which have come to be known as "PalmCorders". Such PalmCorders are fully adaptable for use in conjunction with the stabilized equipment support which is disclosed in U.S. Pat. No. 4,946,272, achieving commensurate improvements in operational stability and in the quality of the video images which can be produced. However, in practice, two factors were found to exist in conjunction with operations of such equipment which were peculiar to PalmCorders, and which needed to be addressed.

First, the popularity of PalmCorders primarily stems from their compactness, and their ability to be handled much like consumer-grade still cameras. Such compactness and ease of use was at times compromised when combined with a stabilized equipment support such as is disclosed in U.S. Pat. No. 4,946,272, since the need then arose to carry a separate device which was somewhat larger than the PalmCorder itself. This not only required the operator to carry two different pieces of equipment for obtaining stabilized video images, but also required either an assembly of the respective units when their use was desired, or a preassembly of such units for "ready-to-use" applications. In each case, this necessitated the accommodation of equipment significantly larger than the PalmCorder in and of itself.

Second, the weight of a PalmCorder is significantly reduced, even from the relatively light "compact" CamCorders. It was found that this significant reduction in weight could at times increase the tendency of the assembled equipment support to "precess" in a manner which tended to compromise its overall operations. The phenomenon of "precession" is best considered when comparing the static balance of the stabilized equipment support with its dynamic balance, particularly during rapid panning of the camera. In static balance, the center of gravity for the unit is placed in alignment with the central axis which is generally defined by the handle of the stabilized equipment support. Such static balance can be established, and maintained when the expanded components of the stabilized equipment support are placed in any of a variety of different locations relative to the handle (and the center of gravity). However, this desired relationship is not necessarily maintained in dynamic operation.

Ideally, movement of the camera, and the stabilized equipment support, should cause rotations along an axis which is parallel to the central axis defined by the handle of the stabilized equipment support. However, in practice, this relationship is not necessarily maintained (depending upon the expanded arrangement of components associated with the stabilized equipment support). In such cases, rotations (e.g., resulting from panning of the camera and the stabilized equipment support) will tend to occur about an axis which is disposed at an angle relative to the central axis defined by the handle. This, in turn, causes the camera to precess about the handle when in this configuration, which is exhibited as an unintentional wobble of the resulting unit toward the true (central) axis of the system.

It therefore became desirable to adapt the stabilized equipment support which is disclosed in U.S. Pat. No. 4,946,272 so that the fundamental improvements of this device could be achieved in conjunction with Palm-Corders and other miniaturized camera equipment of this general type.

SUMMARY OF THE INVENTION

It is therefore the primary object of the present invention to provide a stabilized support for isolating miniaturized camera equipment from unwanted motions resulting from the operation of such equipment.

It is also an object of the present invention to provide a stabilized equipment support for use in conjunction with miniaturized video cameras, which can be hand-held by the operator.

It is also a object of the present invention to provide a stabilized equipment support which can be used in conjunction with miniaturized, hand-held video cameras such as PalmCorders and the like, by forming an adjunct of the video camera which permits the stabilized equipment support to assume a variety of useful operating positions without significant increasing the overall size, weight and/or bulkiness of the assembly when combined with its associated video camera.

It is also an object of the present invention to provide a stabilized equipment support which can be used in conjunction with miniaturized, hand-held video cameras such as PalmCorders and the like, which facilitates operations of the camera while minimizing the potential for precession of the camera while in use.

It is also an object of the present invention to provide a stabilized equipment support of this general type, which is sufficiently simple in construction and use to facilitate the efforts of even amateur operators, at a reasonable cost to the user.

It is also an object of the present invention to provide a stabilized equipment support of this general type, which is well adapted to a variety of applications.

These and other objects are achieved in accordance with the present invention by providing a stabilized equipment support which is both small and light-weight in construction, and which receives the equipment (e.g., a camera) with which it is to be used upon an expanded support network which complements the supported equipment in a manner which not only alters the position of the center of gravity for effective support of the resulting assembly, but which further ensures that the equipment support can be folded into a compact arrangement which does not significantly increase the profile, or overall size of the assembled combination, yet easily deployed to assume an expanded balanced arrangement which is appropriate for effective operations of the resulting assembly to achieve highly stable images in simple and straightforward fashion, while minimizing the potential for precession during such use. Such improvements are achieved by properly configuring the struts which are used to interconnect the platform for receiving the video camera, the video monitor, and the battery which is used to operate such components.

For example, the struts are configured so that in a folded position, a main strut of the assembly is brought underneath the video camera, securely retaining the handle between the strut and the video camera and aligning the battery directly behind the video camera, and an auxiliary strut is configured to place the video monitor associated with the system directly in front of the video camera. The resulting structure is then foldable to a profile which closely corresponds to that of the video camera with which the stabilized equipment support is associated. As a result of this, the compact profile of a PalmCorder is left virtually uncompromised, easily fitting within a carrying case or other convenient carrying device.

The struts are further configured so that the stabilized equipment support can be deployed into any of several different positions, which permit operation of the video camera from a cradled position resting upon the arm of the operator, an over-head position supported by the hand of the operator, as well as an expanded balanced arrangement in which the deployed equipment support is engaged by its handle, for any of a variety of ambulatory operations. In their fully deployed position, the struts are configured to automatically position the several components comprising the expanded equipment support so that all components are placed in proper orientation relative to one another to minimize the potential for precession.

The result is a combined video camera and camera equipment support which can not only provide the significant operational enhancements of the stabilized equipment support which is disclosed in U.S. Pat. No. 4,946,272, but which is also particularly well suited for use in conjunction with miniaturized video cameras, including the PalmCorders which have recently gained such wide public acceptance.

For further detail regarding a preferred embodiment stabilized equipment support in accordance with the present invention, reference is made to the detailed description which is provided below, taken in conjunction with the following illustrations.

BRIEF DESCRIPTION OF THE DRAWINGS

FIG. 5 is a perspective view of the stabilized equipment support of the present invention, shown in a folded position which permits over-head operations of the video camera.

In the several views provided, like reference numerals denote similar structures.

DETAILED DESCRIPTION OF THE PREFERRED EMBODIMENT

Figure 1:
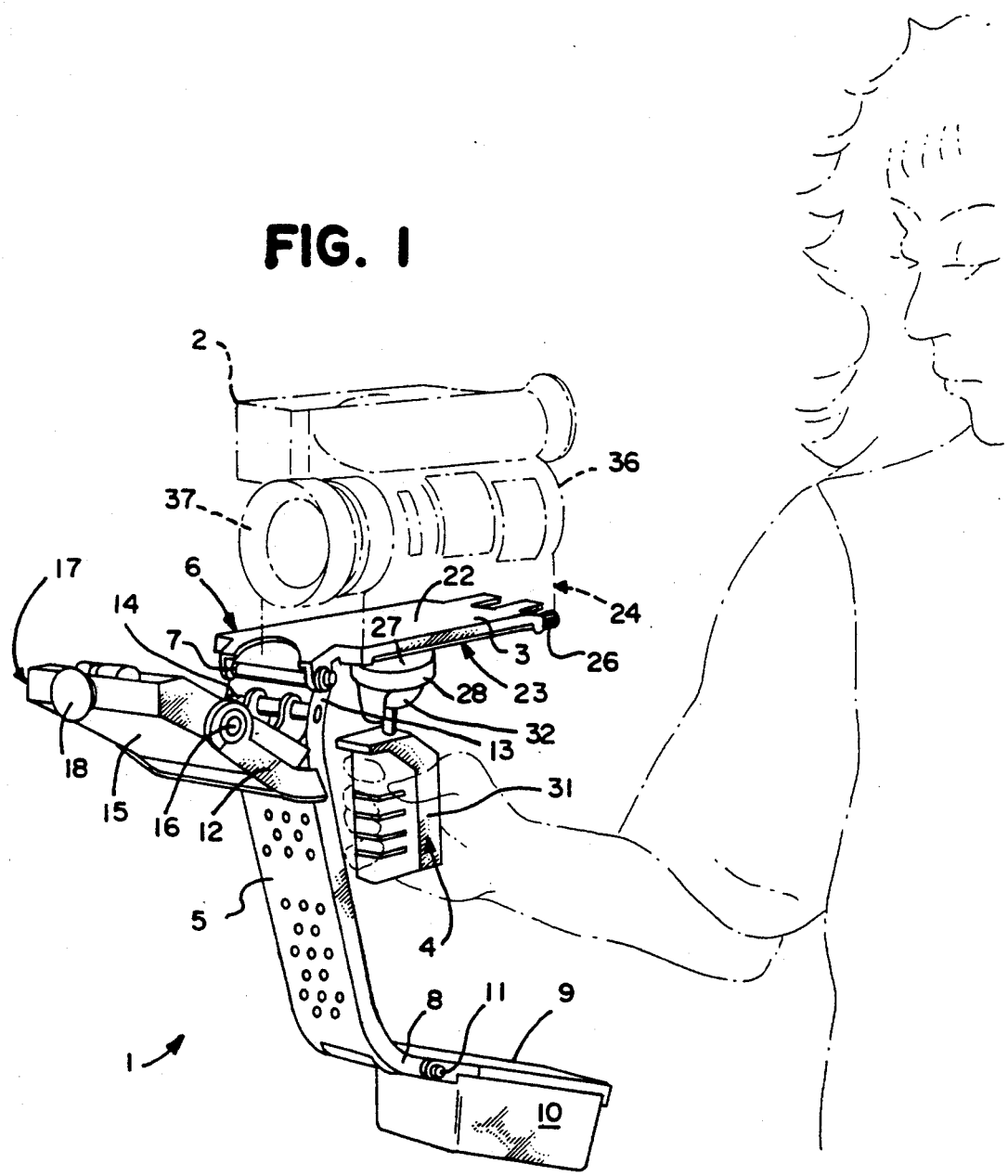
FIG. 1 is a perspective view of the stabilized equipment support of the present invention, shown in combination with a miniaturized video camera.

FIG. 1 generally illustrates a stabilized support 1 for use in connection with a camera 2 which, in the embodiment illustrated, corresponds to a "miniaturized" video camera (PalmCorder) of the type which is conventionally available to consumers. It will be understood that the camera 2 has been selected only for purposes of illustration, and that any of a number of camera configurations other than that shown in the drawings, as well as other types of "equipment" to be supported, may be used with the stabilized support 1 which is illustrated.

Figure 2:
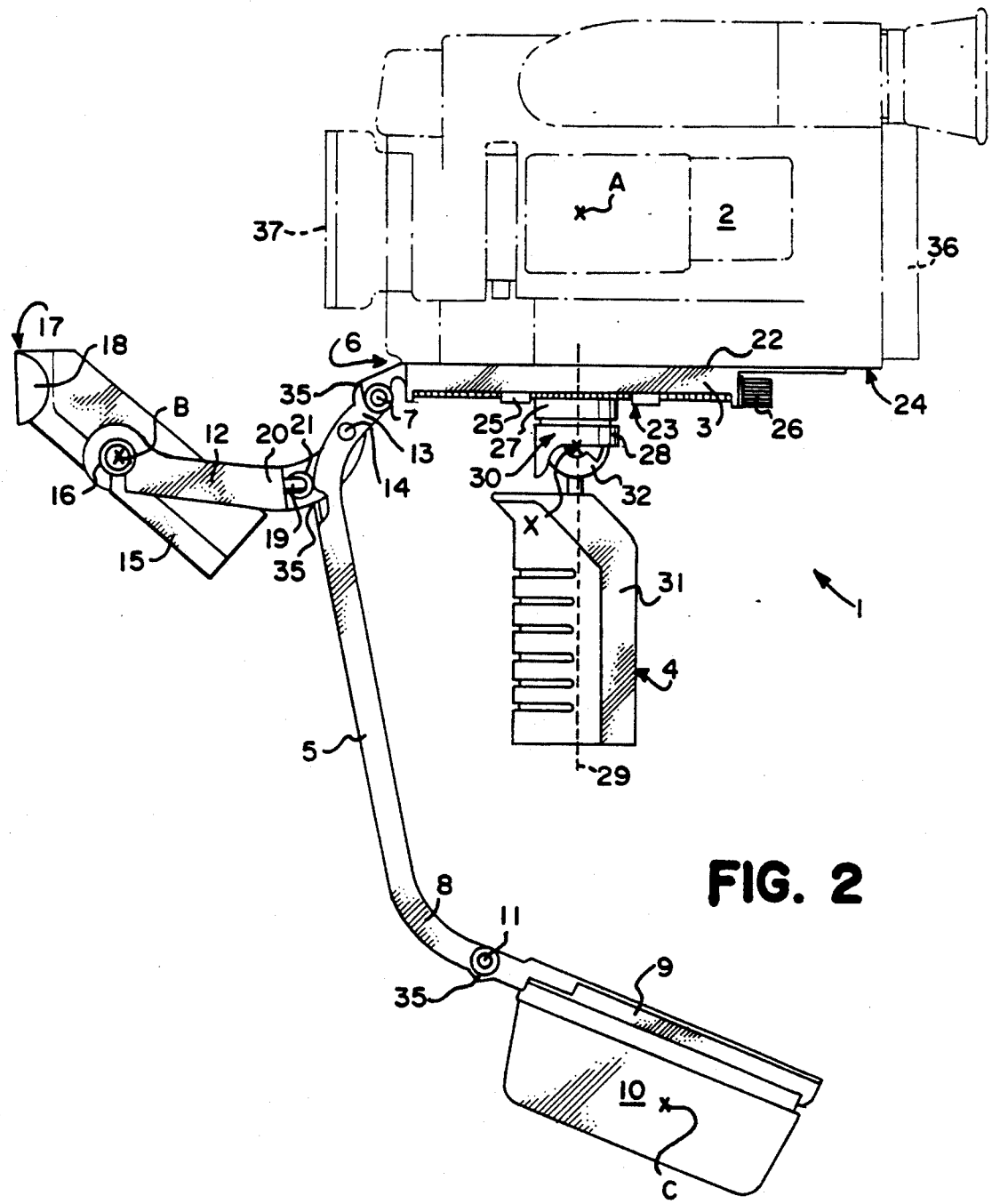
FIG. 2 is a side elevational view of the stabilized equipment support of FIG. 1 in a fully deployed position.

Referring now to FIGS. 1 and 2, the stabilized support 1 includes a platform 3 for receiving the camera 2, and for receiving a handle 4 having the characteristic features of the handle which is disclosed in U.S. Pat. No. 4,946,272. A main strut 5 is attached to forward portions 6 of the platform 3, along a pivot 7. The distal end 8 of the main strut 5 receives a mounting 9 for receiving a battery 10, once again along a pivot 11.

The mounting 9 for receiving the battery 10 is generally plate-like in shape and preferably incorporates mounting structures and electrical contacts (not shown) which correspond to the original mounting structures and electrical contacts of the camera 2. As a result, the battery 10 which is normally associated with the camera 2 (as supplied by the manufacturer) can be transferred from the back of the camera (its normal placement, as manufactured) to the mounting plate 9. This not only avoids the need to have to purchase a separate battery, but also makes use of the weight of the original battery to assist in establishing the expanded balanced arrangement which is desired for proper operation of the stabilized support 1.

An auxiliary strut 12 extends from proximal portions 13 of the main strut 5, at a position which is spaced from the pivot 7 as shown, and receives a viewfinding device 15. As with the camera 2, it is to be understood that the viewfinding device 15 which is shown in the drawings has been selected only for purposes of illustration, and that any of a number of available viewfinding devices may be used in connection with the stabilized support 1 of the present invention, if desired. A first pivot 14 interconnects the auxiliary strut 12 with the proximal portions 13 of the main strut 5, and a second pivot 16 operates to receive the viewfinding device 15.

Forward portions 17 of the viewfinding device 15 advantageously and preferably include a light 18 for illuminating regions forward of the camera 2. The light 18 is preferably recessed within the forward portions 17 of the viewfinding device 15, to reduce interference with the video images which are to be obtained, and to optimize the compact profile of the viewfinding device 15 in order to facilitate closure of the stabilized support 1 as will be more fully described below. While the light 18 may be powered by the battery 10, a separate battery holder 19 is preferably provided along the yoke 20 of the auxiliary strut 12, for receiving additional batteries 21 useful in powering the light 18 without having to rely upon the main battery 10 which operates the camera 2, and preferably, the viewfinding device 15 (although the viewfinding device 15 could alternatively be powered by the batteries 21, if desired).

These basic components of the stabilized support 1 are carefully located to provide a foldable camera support which is capable of achieving two somewhat conflicting tasks. As a first task, the stabilized support 1 can be deployed (see FIG. 2) to develop an expanded, balanced equipment-receiving structure having a mass (including all structures) which is disposed along at least two perpendicular axes (either as a plurality of discrete components or as a single longitudinally disposed mass) in a fashion which increases the rotational inertia of the unit, and which provides access to its center of gravity to provide a stabilized mounting for isolating the camera 2 from the broad spectrum of unwanted high-to-low frequency angular motions which may be encountered. As a second task, the various components of the stabilized support 1 can be folded to a configuration (see FIG. 3) having a profile which is not significantly increased from that of the camera in and of itself, resulting in a folded camera structure which is conveniently transported, either separately or within an appropriate carrying case (not shown). What is more, and as will be discussed more fully below, these functions are virtually automatically provided by effectively configuring the several components of the stabilized support 1, simplifying such operations and ensuring that the improved features of the stabilized support 1 are achievable by the operator irrespective of the operator's level of experience. This is accomplished irrespective of the particular mass or masses which are to comprise the stabilized support 1, as well as the configuration of the camera 2 and the viewfinding device 15.

The platform 3 includes an equipment receiving surface 22, and an adjustment mechanism 23. The surface 22 is generally planar, and is adapted to receive the base 24 of the camera 2. To this end, the surface 22 is preferably either roughened, or provided with a friction-producing material (e.g., a mat or fabric) in order to reduce the potential for movement of the camera 2 upon the surface 22 during use of the stabilized support 1. A variety of means may be used to actually connect the camera 2 to the surface 22. However, a preferred means for accomplishing this interconnection is to employ a threaded fitting (not shown) extending from the surface 22 and into engagement with the threaded receiving boss (not shown) which is traditionally provided (by the manufacturer) in the base 24 of the camera 2. This results in an easily and quickly produced, yet secure and unobstructed mounting for the camera 2.

The adjustment mechanism 23 operates to readily accommodate variations in camera type, as well as variations in placement of the camera 2 upon the surface 22 of the platform 3. The adjustment mechanism 23 generally takes the form of an x-y table 25 disposed beneath the platform 3, and incorporating means for achieving both longitudinal and lateral movements relative to the platform 3 responsive to associated adjustment knobs 26. The x-y table 25 further incorporates a threaded bushing 27 for receiving a threaded end 28 of the handle 4 of the stabilized support 1, so that rotations of the handle 4 provide a third degree of adjustment (z-axis), in addition to the adjustments afforded by the x-y table 25, permitting full adjustment of the stabilized support 1 along three mutually perpendicular axes. In this fashion, operations of the x-y table 25 serve to move the handle 4 relative to the platform 3, both laterally and longitudinally, and along the central axis 29 defined by the handle 4, to establish a proper static balance for the stabilized support 1. Further detail regarding such structure, and its manner of adjustment, may be had with reference to U.S. Pat. No. 4,946,272.

The handle 4 is generally comprised of two discrete, isolated handle portions. One portion of the handle 4 is constituted by the threaded end 28 which is received by the bushing 27 of the x-y table 25, and includes a control surface 30 which is adapted to be grasped by the operator, preferably using the thumb and index finger, for use in orienting the stabilized support 1. The other portion of the handle 4 is constituted by a grip 31, to provide primary support for the stabilized support 1. Although any of a variety of devices may be used to connect the grip 31 and the threaded end 28 of the handle 4 to provide the selected degree of angular isolation which is desired, the use of a gimbal 32 is generally preferred.

As previously indicated, stabilization of the camera support 1 is accomplished by adjustment of the unit to appropriately position its center of gravity relative to the handle 4. This center of gravity is established outside of the camera 2, by the expanded balanced arrangement of the various components comprising the stabilized support 1; in particular, the platform 3 and camera 2, the viewfinding device 15, and the battery/mounting 9, 10. Adjustment of the position of the handle 4 with respect to the center of gravity is accomplished by varying the longitudinal and lateral placement of the x-y table 25, and the extension of the handle 4 within the bushing 27.

Such adjustment combines to provide a three-axis vernier calibration of the spacial position of the handle 4 relative to the remaining portions of the stabilized support 1 in order to permit fine control over the balanced attitude and degree of bottom-heaviness (the vertical axis perpendicular to tilt and roll) of the resulting mass. This is accomplished through appropriate adjustments of the x-y table 25, serving to place the center of gravity of the assembled unit along the central axis 29 (z-axis), and adjustment of the position of this center of gravity along the length of the handle 4 by adjusting the threaded engagement between the end 28 of the handle and the bushing 27 of the x-y table 25.

Previously, it was thought that by properly locating the center of gravity of the stabilized support 1 relative to the controlling surfaces of the handle 4, full stabilization of the associated camera 2 would result. However, despite the significant enhancements which were achievable, it was found that as the weight of the associated camera 2 decreased, particularly when decreased to the level of that of conventionally available PalmCorders, the resulting unit was more easily disrupted by "precession" about the handle 4, away from the primary vertical axis (the central axis 29) of the unit. Accordingly, it was found to be important to carefully control not only the static balance of the unit, but also its dynamic balance, resulting from the manner in which the various components of the stabilized support 1 are positioned relative to one another.

The reason for this is that while the static balance of such components will tend to place the control surface 30 at their collective center of gravity, another important feature that must be taken into account is the rotational axis which is defined by the expanded arrangement of components involved. More specifically, irrespective of the static balance which is established, this rotational axis will necessarily pass through the center of gravity. However, this does not ensure that the rotational axis will extend parallel to the axis which is defined by the handle 4. Rather, it is possible for the rotational axis to form an angle with the axis which is defined by the handle 4, intersecting at the center of gravity which is defined. Deviation of the rotational axis from the axis (the central axis 29) which is defined by the handle 4 tends to promote precession responsive to movements of the stabilized support 1 (e.g., panning). Consequently, it has been found to be important to not only properly position the center of gravity of the stabilized support 1, to achieve a proper static balance, but also to properly position the various components which combine to define this center of gravity relative to one another (so that the rotational axis which is defined extends parallel to the central axis 29 of the handle 4), to achieve a proper dynamic balance as well.

In accordance with the present invention, effective positioning of the various components comprising the stabilized support 1 in order to achieve a correct dynamic balance is automatically established by the struts 5, 12, and their pivotal interconnection with one another and with the remaining components comprising the overall unit. Such positioning will tend to vary with the equipment which is to be received by the stabilized support 1, and to a limited extent, must be empirically determined. However, certain guidelines may be used to facilitate such component placement.

In employing these guidelines, two preferred conditions should be noted. First, the mass of the components comprising the stabilized support 1 should be, and generally will be negligible relative to the mass of the camera 2, the battery 10 and the monitor 15 (with or without the light 18 and batteries 21). Second, the masses of the camera 2, the battery 10 and the monitor 15 (with or without the light 18 and batteries 21) should be positioned in the same vertical plane, both relative to one another and relative to the center of gravity of the overall assembly (operating to eliminate such considerations from the balancing procedures which follow).

Under such conditions, effective dynamic balance of the stabilized support 1 can be achieved as follows. Referring to FIG. 2, four parameters must first be defined including a center of mass A for the camera 2, a center of mass B for the monitor 15, a center of mass C for the battery 10 and a center of gravity X for the overall unit. Making use of these parameters, the following guidelines should then be followed. Mass B should be located at approximately the same horizontal level as the center of gravity X. The masses A and C should each be located aft of the center of gravity X. If, upon testing, rapid panning of the stabilized support 1 causes precession about the central axis 29 such that the camera 2 tilts upwardly, the mass C should be moved aft, and the stabilized support 1 should be returned (re-trimmed) to static balance and re-tested for precession. If, upon testing, rapid panning of the stabilized support 1 causes precession about the central axis 29 such that the camera 2 tilts downwardly, the mass C should be moved forward, and the stabilized support 1 should be returned (re-trimmed) to static balance and re-tested for precession. This should be repeated until an effective dynamic balance of the stabilized support 1 is achieved. Although this procedure could, if desired, be accomplished by adjustably positioning the several components previously described relative to one another (e.g., employing adjustable mountings), it is preferable to identify the proper orientation for such components and then design the stabilized support 1 to fixedly receive the several components in their desired orientations to reduce and simplify trimming of the stabilized support 1 by the operator.

Much of this results from proper selection of the lengths for the struts 5, 12, and the locations for the pivots 7, 11, 14, 16. However, it is additionally necessary to effectively regulate the degree of extension and rotation of the several components associated with the struts 5, 12. Key to this are the relative angles established between the proximal end 13 of the main strut 5 and the platform 3 which receives the camera 2, and between the distal end 8 of the main strut 5 and the mounting 9 for receiving the battery 10.

To automatically achieve an effective positioning of such components relative to one another, upon deployment, both the distal end 8 and the proximal end 13 of the main strut 5, as well as the pivoted connection between the main strut 5 and the auxiliary strut 12, are provided with mechanical stops 35 for automatically ensuring that the several components involved assume the relative angles which are desired for a proper balance (both static and dynamic) of the stabilized support 1. For example, the stop 35 which is associated with the pivot 11 operates to ensure that the mounting 9 for the battery 10 diametrically opposes the distal end 8 of the main strut 5, as best shown in FIG. 2. The stop 35 which is associated with the pivot 7 operates to automatically locate the main strut 5 relative to the platform 3 so that the battery 10 is positioned substantially directly beneath, and slightly to the rear of the handle 4, as is again best shown in FIG. 2. The stop 35 which is associated with the pivot 14 operates to automatically locate the auxiliary strut 12 so that the pivot 16 for receiving the viewfinding device 15 is generally level with the pivot 14, as is again best shown in FIG. 2. These positions are automatically established upon deployment of the stabilized support 1, ensuring that the expanded balanced arrangement which results is proper for establishing both the static balance and the dynamic balance which are desired, by correctly aligning the rotational axis of the stabilized support 1 with the central axis 29 of the handle 4. As a result, the camera 2 is isolated from unwanted angular movements while in operation, without precession.

Although the angular placement of the auxiliary strut 12 relative to the main strut 5 is important to the static and dynamic balance of the stabilized support 1 (and is automatically developed by the stop 35 for the pivot 14), the angular orientation of the viewfinding device 15 relative to the auxiliary strut 12 does not have a material effect upon the overall expanded balanced relationship of the stabilized support 1. Rather, such effects are accounted for by placement of the pivot 16 which interconnects these components. This is important so that the viewfinding device 15 is freely movable to different positions, for the operator's convenience.

Figure 3:
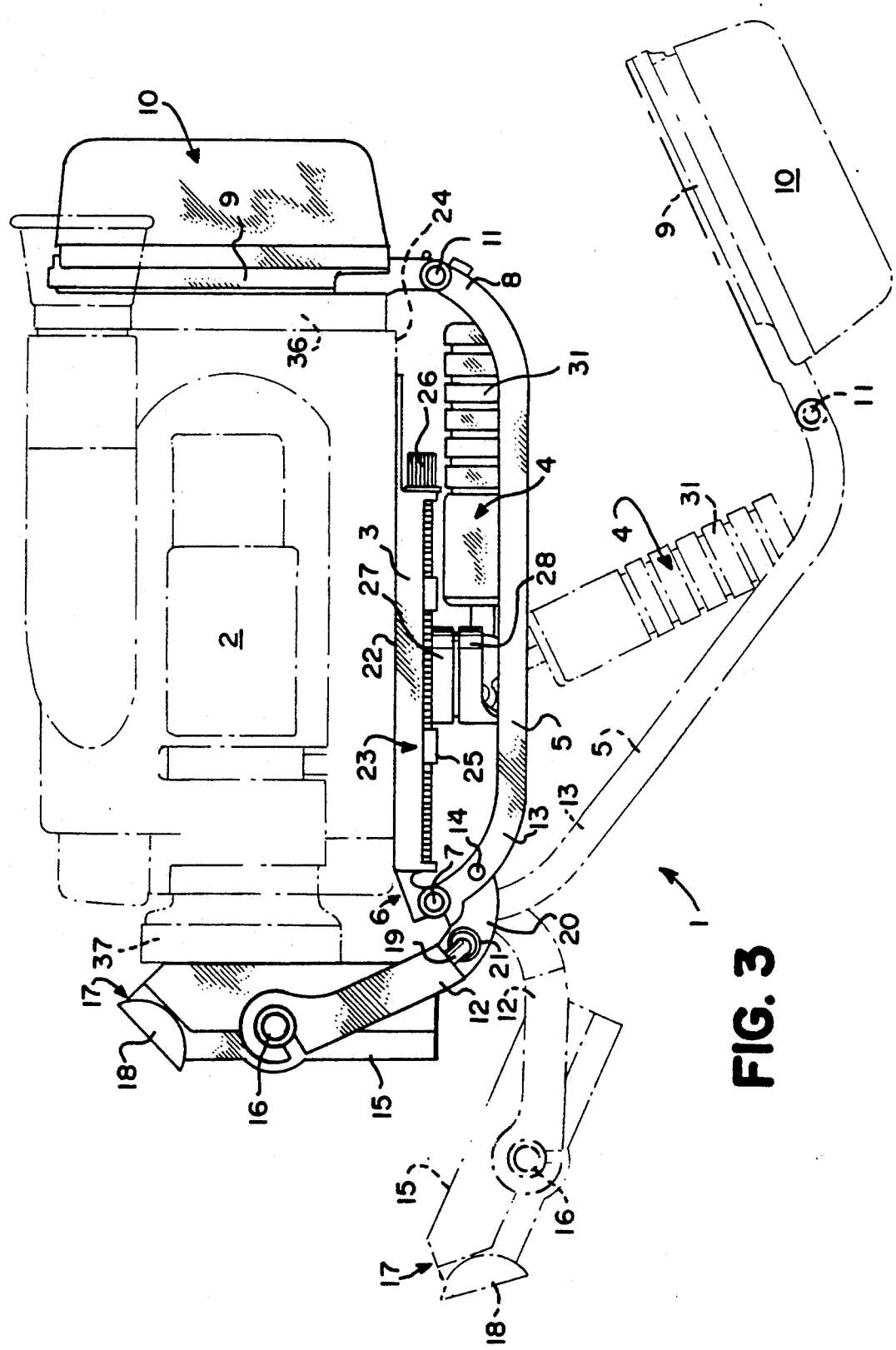
FIG. 3 is a side elevational view of the stabilized equipment support of FIG. 1 in a folded position, also showing intermediate folded positions in phantom.

Referring now to FIG. 3, the configuration selected for the struts 5, 12, and their pivoted interconnection, also serves to permit the stabilized support 1 to be folded into a configuration which closely conforms to that of the camera 2, resulting in a folded structure which is conveniently stored and carried. This is easily accomplished by folding the main strut 5 upwardly from the position shown in FIG. 2, through the intermediate position which is shown in phantom in FIG. 3, to the final position of FIG. 3. In doing so, the handle 4 is automatically engaged by the main strut 5 and is held between the main strut 5 and the platform 3, securing the handle 4 for storage. The mounting 9, with the battery 10, is then folded into close proximity with the rear face 36 of the camera 2, in essence placing the battery 10 in the position which it would normally assume when directly associated with the camera 2. The auxiliary strut 12 is also folded upwardly, bringing the viewfinding device 15 into close proximity with the lens 37 of the camera 2. The result is a folded structure which assumes virtually the same amount of space as did the original camera 2, the only additional structural profile constituting the limited extension of the main strut 5 beneath the base 24 of the camera 2, and the viewfinding device 15 in front of the lens 37. This has the advantage that the folded structure is then easily carried and/or stored in a protective case, as desired.

Ensuring that the stabilized support 1 may be effectively deployed, and folded into a compact configuration, primarily results from effective configuration of the struts 5, 12, and their manner of interconnection. For example, the length of the main strut 5 is selected so that when folded, the battery 10 will be positioned just to the rear of the camera 2, as is desired for compact folding of the stabilized support 1, and so that when deployed, the battery 10 will be positioned aft of the central axis 29, to minimize precession when in operation. The location of the pivot 7, and the curvature imparted to both the proximal end 13 and the distal end 8 of the main strut 5, are selected to ensure compact folding of the main strut 5 (while engaging and securing the handle 4), as well as proper static and dynamic balance of the deployed stabilized support 1 in addition to affording sufficient room (clearance) for receiving the operator's hand when engaging the handle 4. The curvature of the auxiliary strut 12, as well as the distance which separates the pivot 14 from the pivot 7, is selected so that when folded, the viewfinding device 15 will be positioned just to the front of the camera 2 (as is desired for compact folding), and so that when deployed, the viewfinding device 15 will be positioned just forward of and below the camera 2 (as is desired for unobstructed use of the viewfinding device 15 and camera 2). To this end, it should be noted that the pivot 14 is placed relative to the pivot 7 so that upon closure, the pivot 14 will be "carried back" to a position which is appropriate for folding, yet "extended" to a position which is appropriate for positioning of the viewfinding device 15 when the stabilized support 1 is deployed.

Figure 4:
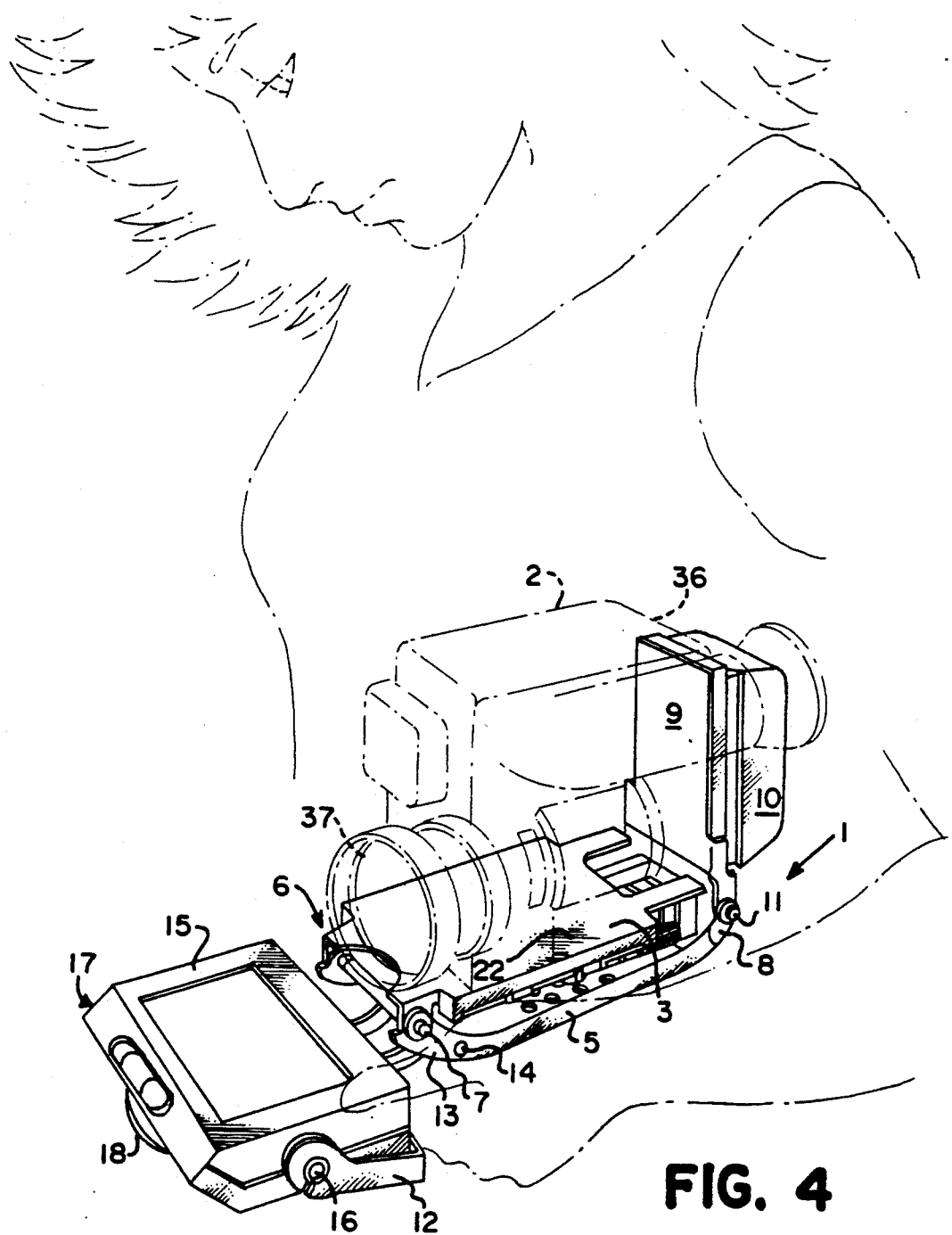
FIG. 4 is a perspective view of the stabilized equipment support of the present invention, shown in a cradled operating position.
Figure 6:
FIG. 6 is a perspective view of the stabilized equipment support of the present invention, shown in a deployed position which permits over-head operations of the video camera.
Figure 6:
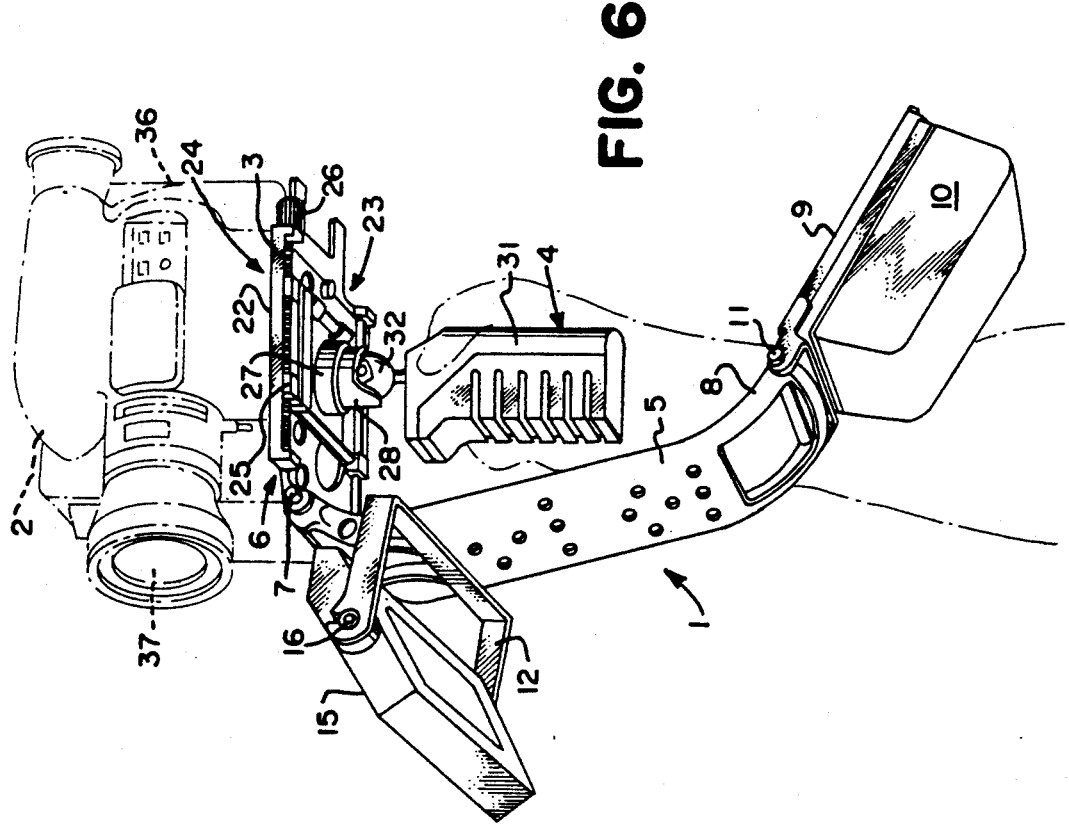

Thus, the above-described foldable structure is both conveniently carried and stored, as well as easily and rapidly deployed for stabilized camera operations. Other operational configurations are further facilitated by the versatility of the stabilized support 1 of the present invention. For example, FIG. 4 illustrates a cradled configuration for the stabilized support 1. In this configuration, the main strut 5, mounting 9 and battery 10 remain in their folded position, resting upon the operator's arm and supported in position against the operator's body. The auxiliary strut 12 is folded downwardly to generally horizontally orient the viewfinding device 15 so that it extends generally transversely from the platform 3 of the stabilized support 1. This provides a clear field of view for the lens 37 of the camera 2, while providing the operator with a clear line of sight to the screen of the viewfinding device 15. FIG. 5 illustrates yet another adaptation of the stabilized support 1. In this configuration, an over-head shot is in progress, and the stabilized support 1 is folded so that the hand-grip which conventionally forms part of the camera 2 is readily engaged by the operator's hand, in usual fashion. However, in this mode, the viewfinding device 15 is rotated downwardly relative to the orientations which are shown in FIGS. 1 to 4, providing the operator with a clear view of the screen of the viewfinding device 15, and enabling the desired over-head video images to be obtained (i.e., in a crowd or over an obstacle). As shown in FIG. 6, over-head shots may also be obtained while the stabilized support 1 is fully deployed and supported by the handle 4. In this configuration, stabilized video images can be obtained.

The viewfinding device 15 is pivoted relative to the auxiliary strut 12, at 16, to permit any of a variety of useful positions to be assumed by the viewfinding device 15, affording the camera operator with significant versatility in use. For example, it may be desired to alter the angle of the viewfinding device 15 to accommodate the positioning of the stabilized support 1 relative to the camera operator, or to accommodate differences in the size (height) of the operator, in addition to changes for accommodating the mode of operation of the stabilized support 1, as previously described.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An equipment support which is capable of being hand-held with improved stability against angular deviations in pan, tilt and roll to isolate equipment for use with said equipment support, including equipment to be oriented and equipment associated with said equipment to be oriented, from unwanted angular movements caused by motion of the equipment support when in use, comprising:

equipment support means for receiving said equipment, wherein said equipment support means is foldable between a folded position in which said equipment support means and said associated equipment closely surround said equipment to be oriented, and a deployed position in which said equipment support means develops an expanded, balanced arrangement which provides an accessible center of gravity; and handle means for engagement by at least one hand of an operator and for attachment to said equipment support means to access said center of gravity, including a gripping portion for supporting and transporting the weight of said equipment and said equipment support means, and an orienting portion for orienting said equipment to be oriented, coupled by means for isolating said orienting portion from unwanted angular movements of said gripping portion caused by movements of said handle means.

2. The equipment support of claim 1 wherein said equipment to be oriented is a camera.

3. The equipment support of claim 2 wherein said camera is a self-contained, miniaturized video camera/-recorder.

4. The equipment support of claim 3 wherein said associated equipment includes viewfinding means for displaying images produced by said camera.

5. The equipment support of claim 4 wherein said viewfinding means is spaced from said camera.

6. The equipment support of claim 5 wherein said viewfinding means is positioned to display said produced images to the operator without coming into contact with said operator.

7. The equipment support of claim 5 wherein said viewfinding means is spaced from said camera by a strut which progresses forward and generally below said camera.

8. The equipment support of claim 4 wherein said viewfinding means includes means for lighting regions forward of said camera.

9. The equipment support of claim 8 wherein said lighting means is recessed within forward portions of said viewfinding means.

10. The equipment support of claim 8 wherein said viewfinding means includes a battery for operating said lighting means, separate from said camera and said viewfinding means.

11. The equipment support of claim 10 wherein said battery is mounted to a strut for receiving said viewfinding means.

12. The equipment support of claim 4 wherein said associated equipment includes a battery for operating said camera.

13. The equipment support of claim 12 wherein said battery is spaced from said viewfinding means and said camera.

14. The equipment support of claim 13 wherein said battery is spaced from said camera and said viewfinding means by a strut which progresses downwardly and rearwardly from forward portions of said camera.

15. The equipment support of claim 14 wherein said equipment support means, said viewfinding means and said battery form an enclosure which is open to receive an arm of said operator.

16. The equipment support of claim 15 wherein said enclosure is open to the rear, facing said operator.

17. The equipment support of claim 3 and a viewfinding means and a battery attached to said equipment support means.

18. The equipment support of claim 17 and a camera attached to said equipment support means.

19. The equipment support of claim 18 wherein said equipment support means is integral with said camera.

20. The equipment support of claim 1 wherein said isolation means is adjustably positioned with respect to said center of gravity.

21. The equipment support of claim 20 wherein said isolation means is adjustable along two mutually perpendicular axes.

22. The equipment support of claim 21 wherein said isolation means is adjustable along three mutually perpendicular axes.

23. The equipment support of claim 20 wherein said isolation means is adjustably positioned with respect to said center of gravity by adjusting said center of gravity.

24. The equipment support of claim 20 wherein said isolation means is adjustably positioned with respect to said center of gravity by adjusting said isolation means.

25. The equipment support of claim 20 wherein said equipment support means includes a platform for receiving said equipment to be oriented.

26. The equipment support of claim 25 wherein said equipment to be oriented is seated in fixed position upon said platform, and wherein said platform includes means for retaining said fixed equipment to said platform.

27. The equipment support of claim 25 wherein said platform includes means for adjustably positioning said handle means relative to said platform.

28. The equipment support of claim 27 wherein said positioning means incorporates a vernier adjustment for moving said handle means to fixed positions along said platform.

29. The equipment support of claim 28 wherein said positioning means is an x-y table.

30. The equipment support of claim 28 wherein said positioning means positions said center of gravity axially within said handle means.

31. The equipment support of claim 28 wherein said positioning means incorporates an adjustment for moving said handle means to fixed positions toward and away from said platform.

32. The equipment support of claim 31 wherein said handle means is threadingly engaged by said platform.

33. The equipment support of claim 31 wherein said positioning means positions said center of gravity in substantial alignment with the isolation means comprising said handle means, thereby placing said equipment support in static balance.

34. The equipment support of claim 33 wherein said equipment support means includes a first strut with proximal portions pivotally connected to forward portions of said platform and distal portions for receiving battery mounting means pivotally connected to said distal portions, and a second strut having a first end pivotally connected to the proximal portions of said first strut and a second end for receiving said viewfinding means.

35. The equipment support of claim 34 wherein said pivotal connections include stop means for regulating extension of the first strut, the battery mounting means, and the second strut.

36. The equipment support of claim 35 wherein said stop means cooperate with said equipment support means to define a rotational axis responsive to movements of said equipment support, and wherein said rotational axis is substantially parallel to a central axis defined by said handle means, thereby placing said equipment support in dynamic balance.

37. The equipment support of claim 1 wherein said equipment support means includes a platform for receiving said equipment to be oriented.

38. The equipment support of claim 37 wherein said platform includes means for receiving said handle means, and for adjustably positioning said handle means relative to said platform.

39. The equipment support of claim 38 wherein said positioning means is an x-y table.

40. The equipment support of claim 38 wherein said equipment support means includes a first strut having a proximal end which is pivotally connected to forward portions of said platform, and a distal end which pivotally receives means for mounting a battery for operating said equipment.

41. The equipment support of claim 40 wherein said battery corresponds to a battery for operating said equipment to be oriented when separate from said equipment support means.

42. The equipment support of claim 40 wherein said first strut has a length which substantially corresponds to a distance measured from the forward portions of said platform to rearward portions of the equipment to be oriented which is received by said platform.

43. The equipment support of claim 40 wherein said equipment support means further includes a second strut having a first end pivotally connected to said first strut, and a second end for pivotally receiving a viewfinding device.

44. The equipment support of claim 43 wherein the first end of said second strut is pivotally connected to said first strut at a location which is spaced from the proximal end of said first strut.

45. The equipment support of claim 44 wherein said second strut includes battery holder means for receiving a battery for operating said equipment.

46. An equipment support which is capable of being hand-guided with improved stability against angular deviations in pan, tilt and roll to isolate equipment for use with said equipment support, including equipment to be oriented and equipment associated with said equipment to be oriented, from unwanted angular movements caused by motion of the equipment support when in use, comprising:

equipment support means for receiving said equipment, wherein said equipment support means is foldable between a first position in which said equipment support means and said associated equipment closely surround said equipment to be oriented, and a second position in which said equipment support means develops an expanded, balanced arrangement which provides an accessible center of gravity; and handle means for supporting the weight of said equipment and said equipment support means, and including isolation means for coupling said handle means with said equipment support means while isolating said equipment support means from said unwanted angular movements caused by motion of said equipment support means responsive to movement of said handle means, and means for orienting said supported equipment for controlled pan, tilt and roll free from said unwanted angular movements and aligned with said isolation means and said equipment to be oriented.

47. The equipment support of claim 46 wherein said second position is a fully deployed position which automatically develops said expanded, balanced arrangement.

48. The equipment support of claim 47 wherein said equipment support means includes means for adjusting the position of said handle means relative to said equipment support means, and for placing said equipment support in static balance.

49. The equipment support of claim 48 wherein said deployed position automatically develops a rotational axis responsive to movements of said equipment support which is substantially parallel to a central axis defined by said handle means, for placing said equipment support in dynamic balance.

50. A method for trimming an equipment support which is capable of being hand-held with improved stability against angular deviations in pan, tilt and roll to isolate equipment for use with said equipment support, including equipment to be oriented and equipment associated with said equipment to be oriented, from unwanted angular movements caused by motion of the equipment support when in use;

said equipment support comprising equipment support means for receiving said equipment and including a platform for receiving said equipment to be oriented, wherein said platform includes means for adjustably positioning a handle for engagement by at least one hand of an operator relative to said platform, a first strut having a proximal end which is pivotally connected to forward portions of said platform and a distal end which pivotally receives means for mounting a battery for operating said equipment, and a second strut having a first end pivotally connected to said first strut and a second end for pivotally receiving a viewfinding device; and said method comprising the steps of locating a center of mass defined by said viewfinding device approximately at the same horizontal level as a center of gravity defined by said equipment support, locating a center of mass defined by said equipment to be oriented and a center of mass defined by said battery aft of a central axis extending through said handle and said center of gravity, rapidly panning said equipment support, and moving the center of mass defined by said battery fore and aft responsive to precessions of said equipment support about said central axis.

51. The method of claim 50 wherein said precession of the equipment support causes said equipment to be oriented to tilt upwardly, and wherein said trimming further comprises the steps of adjusting the center of mass defined by said battery by moving said battery aft, and establishing a static balance for said adjusted center of mass.

52. The method of claim 50 wherein said precession of the equipment support causes said equipment to be oriented to tilt downwardly, and wherein said trimming further comprises the steps of adjusting the center of mass defined by said battery by moving said battery forward, and establishing a static balance for said adjusted center of mass.

53. The method of claim 50 wherein said trimming further comprises the step of aligning the center of mass defined by said equipment to be oriented, the center of mass defined by said battery, the center of mass defined by said viewfinding device, and said center of gravity in a single vertical plane.

* * * * *